United States Patent [19]
Tsujimoto

[11] Patent Number: 5,752,173
[45] Date of Patent: May 12, 1998

[54] DIVERSITY COMMUNICATION SYSTEM WITH ADAPTABLY ORIENTED MULTIPLE BEAM PATTERNS

[75] Inventor: Ichiro Tsujimoto, Tokyo, Japan

[73] Assignee: NEC Corporation, Japan

[21] Appl. No.: 470,986

[22] Filed: Jun. 6, 1995

[30] Foreign Application Priority Data

Jun. 7, 1994 [JP] Japan ............................ 6-148627

[51] Int. Cl.$^6$ ........................................... H04L 1/02
[52] U.S. Cl. ........................ 455/137; 455/273; 375/299
[58] Field of Search .......................... 455/137, 138, 455/139, 273, 52.3, 65; 375/347, 266, 299

[56] References Cited

U.S. PATENT DOCUMENTS

| | | | |
|---|---|---|---|
| 4,939,791 | 7/1990 | Bochmann et al. | 455/137 |
| 5,031,193 | 7/1991 | Atkinson et al. | 455/138 |
| 5,056,109 | 10/1991 | Gilhousen et al. | 375/205 |
| 5,335,359 | 8/1994 | Tsujimoto et al. | 455/138 |
| 5,425,059 | 6/1995 | Tsujimoto | 455/137 |
| 5,481,570 | 1/1996 | Winters | 455/137 |

OTHER PUBLICATIONS

K. Watanabe, "*Adaptive Matched Filter and Its Significance to Anti-Multipath Fading*", IEEE, 1986, pp. 1455–1459.

Primary Examiner—Chi H. Pham
Assistant Examiner—Lester G. Kincaid
Attorney, Agent, or Firm—Ostrolenk, Faber, Gerb & Soffen, LLP

[57] ABSTRACT

In a diversity communication system, groups of receive units are provided corresponding respectively to arrays of antennas to process incoming signals which are propagated over different paths from a transmitter. In order to orient the directivity patterns of the antenna arrays toward the transmitter, multiple diversity branches are provided corresponding respectively to the groups of receive units. Each diversity branch includes multiple complex multipliers for respectively multiplying the processed incoming signals from the corresponding receive units by weight coefficients. Delays are then introduced respectively to the processed incoming signals so that the delayed signals are time-coincident with a decision signal, and the weight coefficients of the complex multipliers are derived from correlations between the delayed signals and the decision signal. The outputs of the complex multipliers of each diversity branch are combined together to produce a sum signal, and the delay-dispersed components of the sum signal are converged and maximal-ratio combined in an adaptive matched filter according to the decision signals of the diversity branches. A diversity combiner combines the output signals of the diversity branches to produce a space-domain diversity-combined signal, which is then adaptively equalized by a decision feedback equalizer to produce the decision signal.

5 Claims, 3 Drawing Sheets

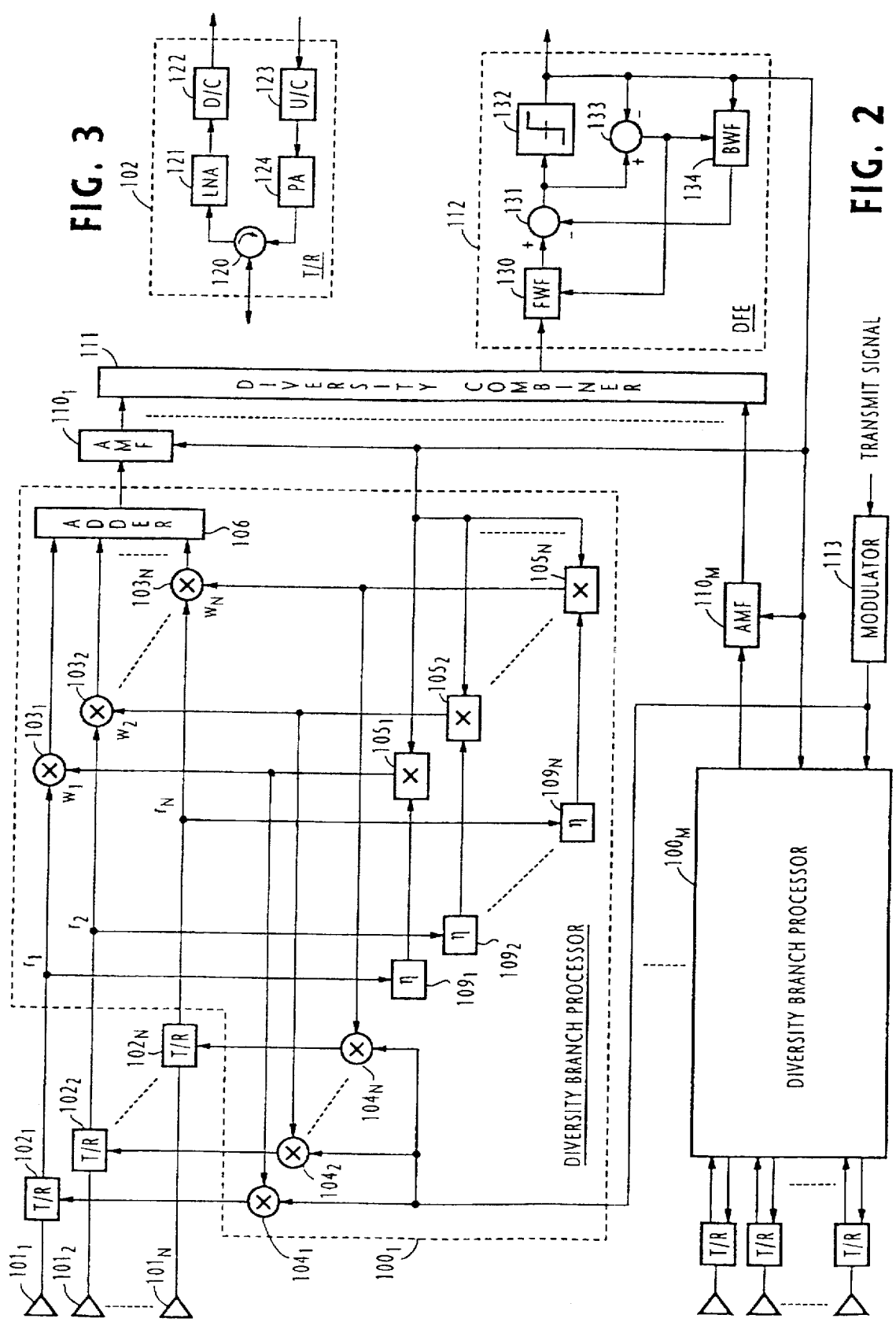

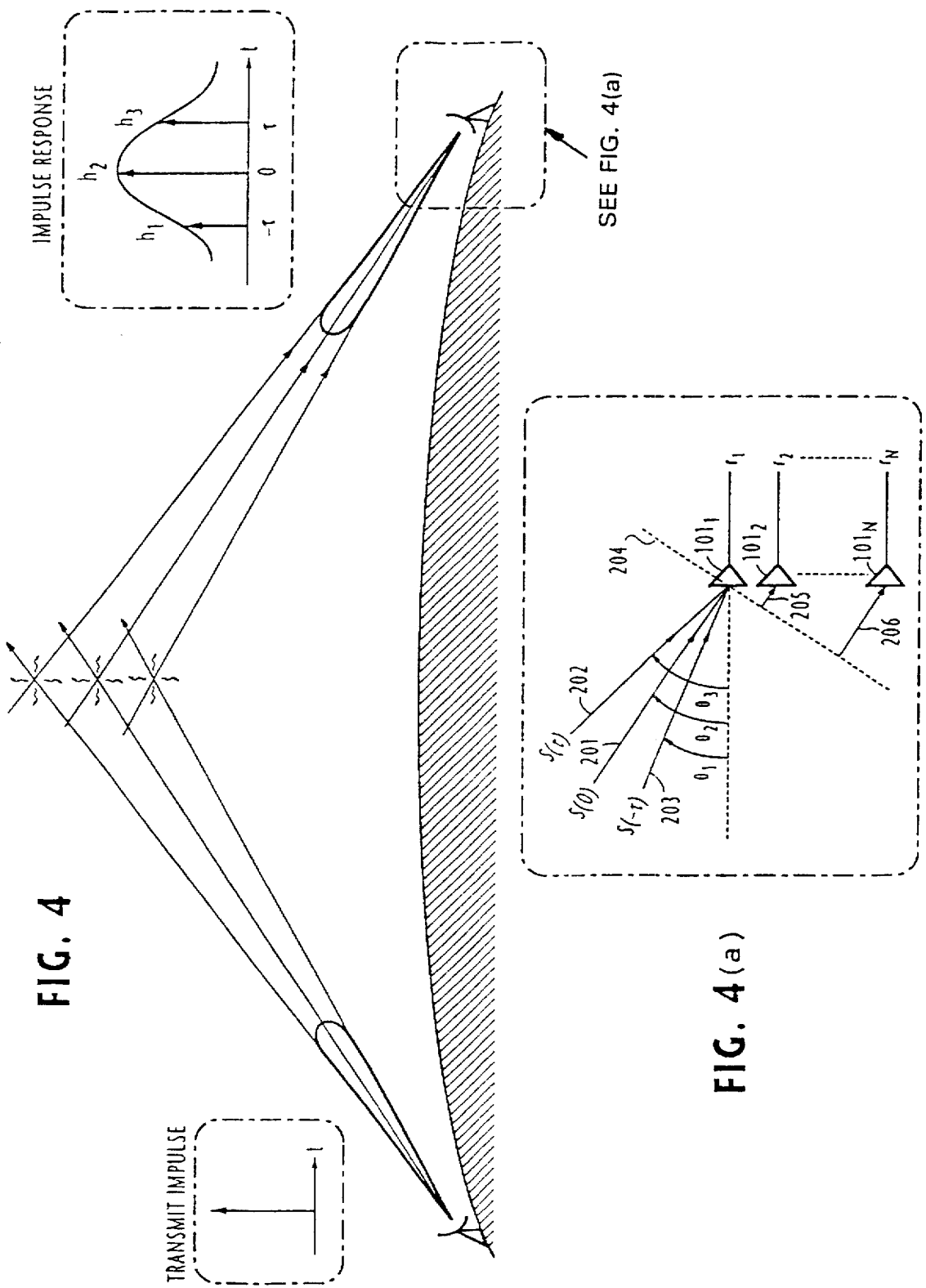

DIVERSITY COMMUNICATION SYSTEM WITH ADAPTABLY ORIENTED MULTIPLE BEAM PATTERNS

BACKGROUND OF THE INVENTION

1. Field of the Invention

The present invention relates generally to diversity communications systems, and more particularly to a diversity communication system that employs adaptive filtering and adaptive equalizing techniques.

2. Description of the Related Art

As described in a paper "Adaptive Matched Filter and Its Significance to Anti-Multipath Fading" Kojiro Watanabe, IEEE, ICC 1986, pages 1455-1459, a prior art AMF (adaptive matched filter)/DFE (decision feedback equalizer) transceiver (FIG. 1) includes large aperture antennas 400, low-noise amplifiers 401, down-converters 402, adaptive matched filters 403, a combiner 404, a decision feedback equalizer 405, a modulator 406, up-converters 407, and high power amplifiers 408. High power amplifiers 408 use klystron tubes for power amplification. The use of the large aperture antennas and high power amplifiers is to secure a sufficient system gain for troposcatter radio links. A modulated carrier is supplied to up-converters 407 where each signal is converted to a microwave frequency and power-amplified by the respective high power amplifiers and fed to the transmit horns of the antennas 400. The outputs of the high power amplifiers 408 are connected to the horizontally polarized transmit horns of the antennas 401. Signals detected by the vertically polarized horns of antennas 400 are low-noise amplified by amplifiers 401 and converted to intermediate frequency signals by the down-converters 402, the outputs of which are respectively supplied to adaptive matched filters 403 where their signal-to-noise ratios are maximized, their amplitudes are squared and their phases are aligned. By combining the outputs of the adaptive matched filters 403 in the combiner 404, a maximal-ratio diversity combining is provided. The output of the combiner 404 is fed to the decision feedback equalizer 405 where adaptive equalization produces a decision output signal, which is also used as a tap weight coefficient control signal for the matched filters 403.

In troposcatter radio links, transmitted microwave energy is scattered as it encounters a region called "scatter volume" and a portion of the energy is forwardly scattered and propagates toward the receive side of the system. In a three-wave propagation model consisting of three multiple paths having different propagation delays, if a pulse is transmitted, there will result a set of three delay-dispersed responses spaced at intervals τ, i.e., the early response $h_1$, the main response $h_2$ and the delayed response $h_3$. In such a multipath environment, the scattering effect causes Rayleigh fading, and impulse responses $h_1$, $h_2$, $h_3$ vary randomly both in amplitude and phase, producing a severe distortion. Adaptive equalization and diversity combining techniques are used to solve the distortion problem.

The adaptive matched filter is a transversal filter which provides convolution of the time-reversed complex conjugate h*(−t) of channel impulse response h(t) on received symbols. This is implemented by multiplying received symbols by three tap weight coefficients, and maximal-ratio combining the multiplied symbols in the time domain. The matched filtering of signals on diversity branches and correlatively weighting the filtered diversity branch signals with the output of the adaptive equalizer absorbs the timing differences between the diversity branches. The time-domain diversity combining (implicit diversity) and space- or frequency-domain diversity combining produce a synergistic effect with which the received signal is improved.

While, in most cases, the matched filtering technique is used to maximize the signal-to-noise ratio of a received signal, multipath-related intersymbol interference still remains in the filtered signal as a residual component. By removing the residual component with the decision feedback equalizer, high signal quality is obtained.

In addition to the short-term fading, varying climatic conditions cause the scatter volume to move upwards or downwards, and hence the angles of incidence at the receive antennas vary accordingly. Specifically, the median of the received signal level at each of the receive antennas could possibly vary in a range of several tens of decibels, producing large differences between diversity branches to such an extent that the effect of diversity combining would be lost. As a result, the climate-related, long-term fading is another problem of troposcatter radio links.

SUMMARY OF THE INVENTION

It is therefore an object of the present invention to provide a diversity communication system capable of instantly steering an array of antennas to optimal directions under short-term and long-term fading conditions.

Another object of the present invention is to provide a diversity communication system in which adaptive matched filters and adaptive antenna arrays are independently controlled.

A further object of the present invention is to provide a compact diversity communication system which eliminates the use of large aperture antennas and klystron high power amplifiers.

According to the present invention, there is provided a diversity communication system comprising a plurality of arrays of antennas and a plurality of groups of receive units are provided so that the groups correspond respectively to the antenna arrays. The receive units of each group respectively process incoming signals from the antennas of the corresponding array. A plurality of diversity branches are connected respectively to the arrays of antennas. Each of the diversity branches comprises a plurality of complex multipliers for respectively multiplying the processed incoming signals by weight coefficients, a plurality of correlators for determining correlations between the processed incoming signals and a decision signal and deriving therefrom the weight coefficients of the complex multipliers, a plurality of delay means for providing delays to the processed incoming signals respectively so that each of the delayed signals and the decision signal are time-coincident with each other at the inputs of each of the complex multipliers, an adder for combining output signals of the complex multipliers to produce a sum signal, and an adaptive matched filter for converging delay-dispersed components of the sum signal and maximal-ratio combining the components according to the decision signal to produce an output signal of the diversity branch. The output signals of the diversity branches are combined a diversity-combined signal by a diversity combiner. A decision feedback equalizer is connected to the diversity combiner for adaptively equalizing the diversity-combined signal and producing therefrom the decision signal for the correlators and the adaptive matched filter of each of the diversity branches.

Preferably, the diversity communication system includes a plurality of groups of transmit units so that the groups correspond respectively to the antenna arrays. The transmit units of each group process outgoing signals and apply the processed outgoing signals to the antennas of the corresponding array. Each diversity branch further includes a plurality of second complex multipliers for multiplying a transmit signal by the weight coefficients derived by the correlators of the diversity branch to produce multiplied transmit signals and respectively supplying the multiplied transmit signals to the transmit units of the corresponding array as said outgoing signals. A transmit beam pattern identical to a receive beam pattern is produced.

For operation in a short-term and long-term fading environment, each of the correlators of each diversity branch has a time constant much larger than the time constant of the adaptive matched filter of the diversity branch.

BRIEF DESCRIPTION OF THE DRAWINGS

The present invention will be described in further detail with reference to the accompanying drawings, in which:

FIG. 2 is a block diagram of an AMF/DFE transceiver for troposcatter radio links according to the present invention;

FIG. 3 is a block diagram of a transmit/receive unit employed in the present invention; and FIGS. 4 and 4(a) are schematic diagrams useful for describing the operation of the present invention.

DETAILED DESCRIPTION

Figure 1:
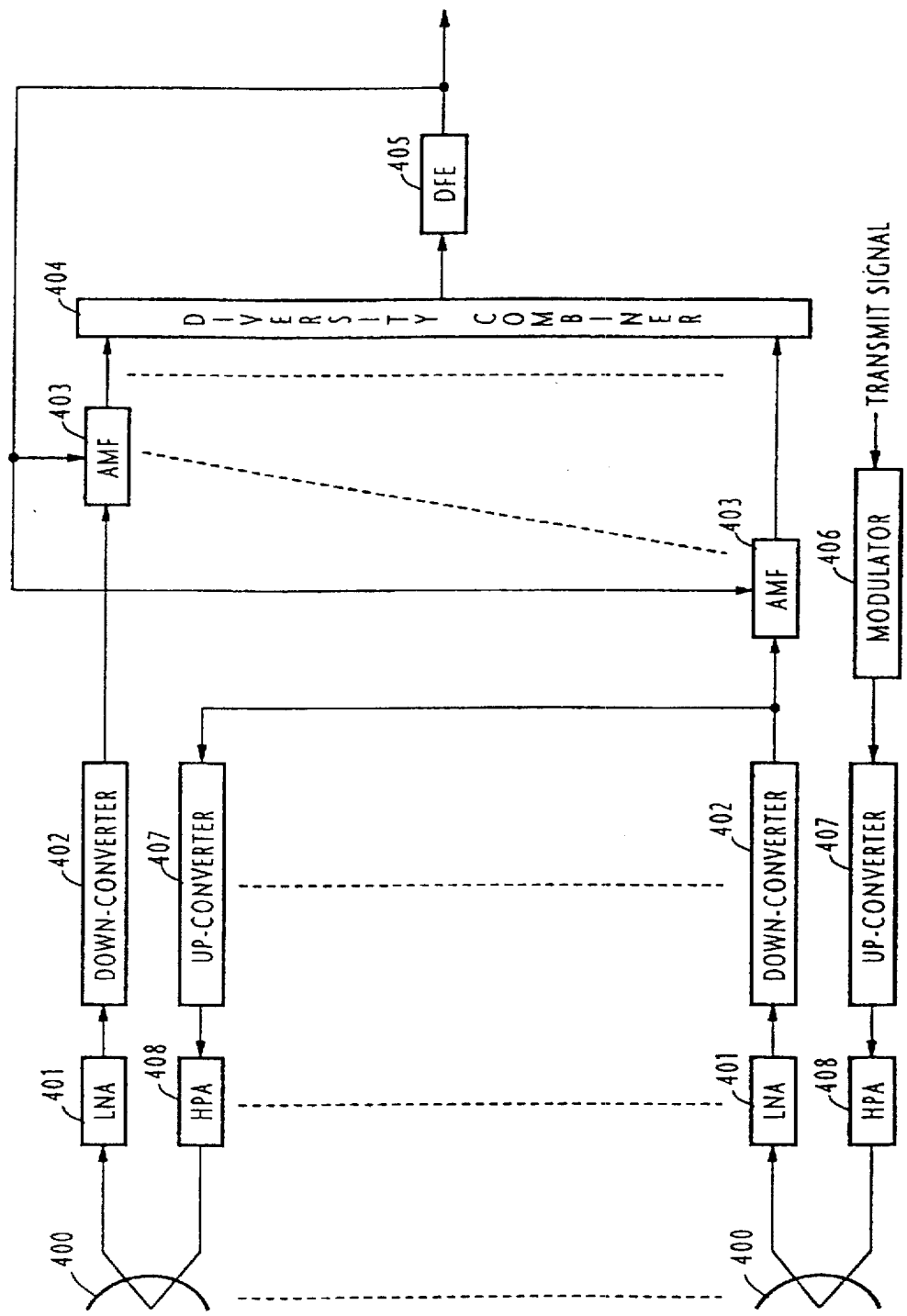
FIG. 1 is a block diagram of a prior art AMF/DFE transceiver.

As illustrated in FIG. 2, the AMF/DFE transceiver of the present invention includes M arrays of small aperture antennas $101_1$-$101_N$ which are spaced apart a distance equal to the half-wavelength of the transmitted carrier, transmit/receive units $102_1$-$102_N$ connected respectively to the antennas of the corresponding array, diversity branch processors $100_1$-$100_M$, adaptive matched filters $110_1$-$110_M$ connected to the output of the corresponding diversity branch processors $100_1$-$100_M$, and a diversity combiner 111 for combining the outputs of the adaptive matched filters $110_1$-$110_M$. A decision feedback equalizer 112 is connected to the output of the diversity combiner 111 to produce a decision signal. A modulator 113 is provided for modulating a transmit signal on an intermediate frequency carrier.

As shown in FIG. 3, each of the transmit/receive units $102_1$-$102_N$ comprises a duplexer 120, a low-noise amplifier 121, a down-converter 122 for frequency translation from the microwave frequency to an intermediate frequency, an up-converter 123 for frequency translation from the intermediate frequency to the microwave frequency, and a transistor power amplifier 124. Transmit/receive units $102_1$-$102_N$ are respectively connected to the outputs of the antennas of the associated array. In each transmit/receive unit 102, the microwave signal from the corresponding antenna is received via duplexer 120 by the low-noise amplifier 121, where it is amplified, and converted to an IF frequency by the down-converter 122. A transmit IF signal is converted to a microwave frequency by up-converter 123, and power amplified by the transistor amplifier 124 and coupled through the duplexer 120 to the corresponding small aperture antenna.

As a representative of the diversity branch processors, the processor $100_1$ is illustrated in detail as comprising first complex multipliers $103_1$-$103_N$ for receiving the output signals of the transmit/receive units $102_1$-$102_N$, respectively. Correlators $105_1$-$105_N$ are provided for supplying weight coefficients to the complex multipliers $103_1$-$103_N$.

The outputs of the multipliers 103 of each processor 100 are supplied to a diversity combiner 106 where they are diversity combined to produce a sum as the output signal of the processor 100. Delay elements $109_1$-$109_N$ are provided to introduce delay $\eta$ to the receive signals from the transmit/receive units $102_1$-$102_N$.

Each of the output of the diversity branch processors $100_1$-$101_M$ is supplied to a corresponding adaptive matched filter 110 of nonrecursive transversal filter. Each matched filter 110 has a tapped delay line and multipliers connected to the delay-line taps for multiplying the tap signals along the delay line with weight coefficients which are derived from correlations between the output of the decision feedback equalizer 112 and the tap signals, so that the amplitudes of time-dispersed components of the input of the matched filter are squared, their phases are converged and maximal-ratio combined to produce an output having a maximized signal-to-noise ratio.

As a result, maximal-ratio diversity combining is further achieved by diversity combiner 111 which is supplied with the outputs of the adaptive matched filters $110_1$-$110_M$. The output signal of diversity combiner 111 is fed to the decision feedback equalizer 112 where it undergoes adaptive equalization, producing a decision output The DFE 112 comprises a forward filter 130, a subtractor 131, a decision circuit 132, an error detector 133 and a backward filter 134. The error detector 133 is connected across the input and output of the decision circuit to detect a decision error. The subtractor 131 detects a difference between the outputs of the forward and backward filters 130, 134. The forward filter 130 receives the output of the adder 111 to remove the intersymbol interference caused by the leading edge of an impulse response (i.e., precursor) and supplies its output to the subtractor 131. The backward filter 134 receives the output of the decision circuit 132 to remove the intersymbol interference caused by the trailing edge of the impulse response (i.e., postcursor) and feeds its output back to the subtractor 131. Each of the forward and backward filters 130, 134 is of transversal filter configuration whose tap weight coefficients are adaptively updated by a controller which detects correlations between the decision error and the tap signals of the respective filters. The tap weight coefficients of these filters are controlled according to the minimum mean square error (MMSE) algorithm, so that the mean square value of the decision error is reduced to a minimum while canceling intersymbol interference.

According to the present invention, the output of the decision feedback equalizer 112 is fed back to each of the adaptive diversity branch processors 100 as well as to the matched filters 110. In each diversity branch processor, the decision signal is applied to the correlators $105_1$-$105_N$, where correlations are taken between it and the received IF signals delayed by an amount equal to $\eta$ by delay elements $109_1$-$109_N$. From the detected correlations, the correlators 105 derive the weight coefficients of the complex multipliers $103_1$-$103_N$. Processing the received IF signals in this way results in adaptive steering of the beam direction of the array of small aperture antennas $101_1$-$101_N$ to the arrival direction of a desired signal.

FIGS. 4 and 4(a) show multiple propagation paths of troposcatter links for describing the beam pattern steering operation of the processor $100_1$, for example. The main signal S(0) is represented by a vector 201 and its wavefront indicated by numeral 204. The delayed signal S($\tau$) and the early signal S($-\tau$) are respectively indicated by vectors 202 and 203.

Let $\theta_1$, $\theta_2$ and $\theta_3$ be the arrival angles of the early signal $S(-\tau)$, main signal $S(0)$ and delayed signal $S(\tau)$ at the antenna array 101, respectively. The main signal $S(0)$ is received by all elements of the antenna array 101, but because of the half-wavelength spacing between successive antennas, phase delays occur between them.

Using the wavefront 204, FIG. 4(a), as a reference line intersecting the antenna $101_1$, the main signal arrives at antenna $101_2$ with a delay corresponding to a vector 205 and arrives at antenna $101_N$ with a delay corresponding to a vector 206. As a result, the signals $S(-\tau)$, $S(0)$ and $S(\tau)$ arrive at each element of the antenna array 101 with phase delay intervals $\phi_1$, $\phi_2$ and $\phi_3$, respectively, which are given by the following Equations.

$$\phi_1 = \pi \sin\theta_1 \tag{1}$$

$$\phi_2 = \pi \sin\theta_2 \tag{2}$$

$$\phi_3 = \pi \sin\theta_3 \tag{3}$$

Using the phase delay intervals $\phi_1$, $\phi_2$ and $\phi_3$, and representing the received antenna branch signals as a vector $r(t) = r_1, r_2, \ldots, r_N$, a multipath signal vector $r(0)$ at time $t=0$ is given by:

$$r(0) = \begin{bmatrix} r_1 \\ r_2 \\ \cdot \\ \cdot \\ \cdot \\ r_N \end{bmatrix} = h_1 \cdot S(-\tau) \begin{bmatrix} 1 \\ \exp(-j\phi_1) \\ \cdot \\ \cdot \\ \cdot \\ \exp(-jN\phi_1) \end{bmatrix} + h_2 \cdot S(0) \begin{bmatrix} 1 \\ \exp(-j\phi_2) \\ \cdot \\ \cdot \\ \cdot \\ \exp(-jN\phi_2) \end{bmatrix} + h_3 \cdot S(\tau) \begin{bmatrix} 1 \\ \exp(-j\phi_3) \\ \cdot \\ \cdot \\ \cdot \\ \exp(-jN\phi_3) \end{bmatrix} \tag{4}$$

where, the first, second and third terms of Equation (4) represent the signals $S(-\tau)$, $S(0)$ and $S(\tau)$, respectively, and $h_1$, $h_2$ and $h_3$ are the early, the main and the delayed impulse responses, respectively, of the troposcatter links.

Since the main signal $S(0)$ has traveled through the matched filters $110_1 \sim 101_N$ and the forward filter of the DFE 112 before it reaches its decision circuit 132, the delay time $\eta$ introduced by each delay element 109 is set equal to the time taken for the main signal to travel that path. Thus, the decision signal fed back to correlators $105_1 \sim 105_N$ are time-coincident with the delayed IF signals, and can be denoted as $\tilde{S}(\eta)$.

Using Equation (4), the delayed IF signals are represented by the following Equation:

$$r(\eta) = \begin{bmatrix} r_1 \\ r_2 \\ \cdot \\ \cdot \\ \cdot \\ r_N \end{bmatrix} = h_1 \cdot S(-\tau + \eta) \begin{bmatrix} 1 \\ \exp(-j\phi_1) \\ \cdot \\ \cdot \\ \cdot \\ \exp(-jN\phi_1) \end{bmatrix} + h_2 \cdot S(\eta) \begin{bmatrix} 1 \\ \exp(-j\phi_2) \\ \cdot \\ \cdot \\ \cdot \\ \exp(-jN\phi_2) \end{bmatrix} + h_3 \cdot S(\tau + \eta) \begin{bmatrix} 1 \\ \exp(-j\phi_3) \\ \cdot \\ \cdot \\ \cdot \\ \exp(-jN\phi_3) \end{bmatrix} \tag{5}$$

The correlators $105_1 \sim 105_N$ determine the correlations between the components of vector $r(\eta)$ and the decision data $\tilde{S}(\eta)$. Since the value $\eta$ is the same for all IF signals, the correlations are equivalent to the correlations between $r(0)$ and $\tilde{S}(0)$. Thus, the weight coefficient vector $W$ produced by the correlators $105_1 \sim 105_N$ is given by the following relation:

$$W = \begin{bmatrix} W_1 \\ W_2 \\ \cdot \\ \cdot \\ \cdot \\ W_N \end{bmatrix} = E[r^*(0) \cdot S(0)]$$

$$= h^*_1 \cdot E[S^*(-\tau) \cdot S(0)] \begin{bmatrix} 1 \\ \exp(+j\phi_1) \\ \cdot \\ \cdot \\ \cdot \\ \exp(+jN\phi_1) \end{bmatrix} + h \times$$

$$*_2 \cdot E[S^*(0) \cdot S(0)] \begin{bmatrix} 1 \\ \exp(+j\phi_2) \\ \cdot \\ \cdot \\ \cdot \\ \exp(+jN\phi_2) \end{bmatrix} +$$

$$h^*_3 \cdot E[S^*(+\tau) \cdot S(0)] \begin{bmatrix} 1 \\ \exp(+j\phi_3) \\ \cdot \\ \cdot \\ \cdot \\ \exp(+jN\phi_3) \end{bmatrix} \tag{6}$$

where, $E[\cdot]$ represents an expected value obtained by an averaging process, and the symbol * represents complex conjugate.

The time taken to perform an averaging process in each correlator 105 is sufficiently long in comparison with the symbol interval (corresponding to data transmission speed) to prevent multipath fading-related variations from being averaged out in this process. Since, in most cases, the multipath fading-related variations occur at speeds much lower than the data transmission speed, the averaging speed is set at a value higher than the speed of such fading variations, but lower than the data transmission speed. As a result, the averaging process of each correlator 105 takes effect only upon the data symbols, and the coefficients of Equation (6) associated with the multipath fading are not averaged out.

If the decision error of the DFE 112 is negligible, the decision signal $\tilde{S}$ is approximately equal to the transmitted data signal S. By taking the autocorrelation coefficient as "1", the following Equations can be obtained:

$$E[S^*(0) \cdot \tilde{S}(0)] = E[S^*(0) \cdot S(0)] = 1 \quad (7)$$

$$E[S^*(\tau) \cdot \tilde{S}(0)] = E[S^*(\tau) \cdot S(0)] = 0 \quad (8)$$

Substituting Equations (7) and (8) into Equation (6) yields the following weight coefficient vector W from correlators $105_1 \sim 105_N$:

$$W = \begin{bmatrix} W_1 \\ W_2 \\ \cdot \\ \cdot \\ \cdot \\ W_N \end{bmatrix} = H^*_2 \begin{bmatrix} 1 \\ \exp(+j\phi_2) \\ \cdot \\ \cdot \\ \cdot \\ \exp(+jN\phi_2) \end{bmatrix} \quad (9)$$

Thus, the output signal Y of combiner 106 is given as follows:

$$Y = r^T W = [r_1, r_2, \ldots, r_N] \begin{bmatrix} W_1 \\ W_2 \\ \cdot \\ \cdot \\ \cdot \\ W_N \end{bmatrix}$$

$$= h_1 S(-\tau)[1, \exp(-j\phi_1), \ldots, \exp(-jN\phi_1)] h^*_2 \begin{bmatrix} 1 \\ \exp(+j\phi_2) \\ \cdot \\ \cdot \\ \cdot \\ \exp(+jN\phi_2) \end{bmatrix} +$$

$$h_2 S(0)[1, \exp(-j\phi_2), \ldots, \exp(-jN\phi_2)] h^*_2 \begin{bmatrix} 1 \\ \exp(+j\phi_2) \\ \cdot \\ \cdot \\ \cdot \\ \exp(+jN\phi_2) \end{bmatrix} +$$

$$h_3 S(\tau)[1, \exp(-j\phi_3), \ldots, \exp(-jN\phi_3)] h^*_2 \begin{bmatrix} 1 \\ \exp(+j\phi_2) \\ \cdot \\ \cdot \\ \cdot \\ \exp(+jN\phi_2) \end{bmatrix}$$

$$= h^*_2 \cdot h_1 \sum_{n=0}^{N} \exp\{jn(\phi_2 - \phi_1)\} S(-\tau) + N \cdot h^*_2 \cdot h_2 \cdot S(\tau) +$$

$$h^*_2 \cdot h_3 \sum_{n=0}^{N} \exp\{jn(\phi_2 - \phi_3)\} S(+\tau) \quad (10)$$

The second term of Equation (10) relates to the main signal S(0). It indicates that the coefficient $h_2^* \cdot h_2$ is multiplied by N. This is explained by the fact that the main signal components from antennas $101_1 \sim 101_N$ are combined together in phase, giving an amplitude N times greater than the amplitude of each component. The coefficient $h_2^* \cdot h_2$ is the square of the impulse response $h_2$ of the main signal S(0)

and hence it represents the power of the main signal. Therefore, the second term indicates that the main signal S(0) is obtained by maximal-ratio combining.

On the other hand, the first and third terms of Equation (10) relate to the early signal $S(-\tau)$ and the delayed signal $S(\tau)$, respectively. It is seen that, unlike the second term, the impulse response coefficients $h_2^* \cdot h_1$ and $h_2^* \cdot h_3$ of the first and third terms are not of squared values of the main signal response, but of product values of responses whose fading-related variations are mutually uncorrelated, so that they can be treated as noise.

It is seen that the summation of each of the first and third terms indicates that the components of the early and delayed signals $S(-\tau)$ and $S(\tau)$ are not combined in phase, but produce a simple sum of power values. The amplitude of each of the early and delayed signals is therefore significantly lower than the amplitude of main signal S(0).

Therefore, the beam pattern of the array of antennas $101_1 \sim 101_N$ is adaptively controlled by the processor $100_1$ so that it is always oriented in the arrival direction of the main signal S(0). The fact that the coefficient of the main impulse response is equal to $N \cdot h_2^* h_2$ indicates that the antenna array is always tracking the main signal even though its angle of incidence at the array varies with the movement of the scatter volume.

Another factor that must be taken into account is the racing condition which may arise between each diversity branch processor 100 and the corresponding matched filter 110 if their weight coefficients are updated at speeds close to each other. The present invention sets their updating speeds at different values to avoid the racing condition.

More specifically, the function of each matched filter 110 is to maximize the signal-to-noise ratio of the output signal of the corresponding processor 100 by squaring its amplitude and aligning the phases of the short-term fading-related, time-dispersed components of the signal. In contrast, the function of each processor 100 is to provide tracking of a signal whose arrival direction is affected by long-term fading-related variations. Thus, the control speed of each diversity branch processor 100 is set at a value corresponding to the speed of the long-term fading-related variations, rather than to the speed of short-term fading-related variations. Therefore, the time constants of the correlators $105_1 \sim 105_M$ are much greater than those of the matched filters $110_1 \sim 110_M$.

For two-way communications, it is necessary that the transmit and receive antenna patterns of the antenna arrays be identical to each other. This is achieved by supplying the output of the modulator 113 to the complex multipliers $104_1 \sim 104_N$, in each of which the modulated signal is multiplied by a corresponding one of the weight coefficients of the correlators $105_1 \sim 105_N$. The output signals of the complex multipliers $104_1 \sim 104_N$ are fed into the up-converters 123 of corresponding transmit/receive units $102_1 \sim 102_N$ to produce a transmit beam pattern identical to the receive pattern.

What is claimed is:

1. A diversity communication system comprising:
   a plurality of arrays of antennas;
   a plurality of groups of receive units, said groups corresponding respectively to said antenna arrays, the receive units of each group respectively processing incoming signals from the antennas of the corresponding array;
   a plurality of diversity branches corresponding respectively to the groups of receive units:
   a diversity combiner for combining output signals of the diversity branches to produce a space-domain diversity-combined signal;

a decision feedback equalizer for adaptively equalizing the diversity-combined signal and producing therefrom a decision signal; and a plurality of groups of transmit units, said groups corresponding respectively to said antenna arrays, the transmit units of each group processing outgoing signals and applying the processed outgoing signals to the antennas of the corresponding array;

each of the diversity branches including:

a plurality of complex multipliers for respectively multiplying the processed incoming signals from the corresponding group of received units by weight coefficients;

a plurality of delay means for respectively providing delays to the processed incoming signals so that the delayed signals are time-coincident with said decision signal;

a plurality of correlators for determining correlations between the delayed processed incoming signals and the decision signal and deriving therefrom the weight coefficients of the complex multipliers;

an adder for combining output signals of the complex multipliers to produce a sum signal;

an adaptive matched filter for converging delay-dispersed components of the sum signal and maximal-ratio combining said components according to said decision signal to produce a time-domain diversity-combined signal as one of the output signals of the diversity branches, and a plurality of second complex multipliers for multiplying a transmit signal by the weight coefficients derived by the correlators of the diversity branch to produce multiplied transmit signals and respectively supplying the multiplied transmit signals to said transmit units of the corresponding array as said outgoing signals.

2. A diversity communication system as claimed in claim 1, wherein each of said correlators of each of the diversity branches has a time constant larger than a time constant of the adaptive matched filter of the diversity branch.

3. In a diversity communication system having a plurality of arrays of antennas, and a plurality of groups of receive units, said groups corresponding respectively to said antenna arrays, the receive units of each group respectively processing incoming signals from the antennas of the corresponding array, a plurality of diversity branches corresponding to the groups of said receive units, a diversity combiner for combining the output signals of the diversity branches to produce a diversity-combined signal, a decision feedback equalizer for adaptively equalizing the diversity-combined signal and producing therefrom a decision signal, a plurality of groups of transmit units, said groups corresponding respectively to said antenna arrays, the transmit units of each group processing outgoing signals and applying the processed outgoing signals to the antennas of the corresponding array, a method for controlling each of said diversity branches comprising the steps of:

a) providing delays to the incoming signals processed by the receive units of the corresponding group;

b) determining correlations between the delayed incoming signals and said decision signal and deriving therefrom weight coefficients;

c) respectively multiplying the incoming signals by said weight coefficients;

d) combining the multiplied incoming signals to produce a sum signal;

e) converging delay-dispersed components of the sum signal and maximal-ratio combining said components according to said decision signal to produce the output signal of the diversity branch; and f) multiplying a transmit signal by the weight coefficients derived by the step (b) to produce multiplied transmit signals and respectively supplying the multiplied transmit signals to said transmit units of the corresponding array as said outgoing signals.

4. A method as claimed in claim 3, wherein the step (b) is performed at a speed lower than the speed at which the step (e) is performed.

5. A diversity communication system comprising:

a plurality of arrays of antennas;

a plurality of groups of receive units, said groups corresponding respectively to said antenna arrays, the receive units of each group respectively processing incoming signals from the antennas of the corresponding array;

a plurality of diversity branches corresponding respectively to the groups of receive units;

a diversity combiner for combining output signals of the diversity branches to produce a space-domain diversity-combined signal;

a decision feedback equalizer for adaptively equalizing the diversity-combined signal and producing therefrom a decision signal, and a plurality of groups of transmit units, said groups corresponding respectively to said antenna arrays, the transmit units of each group processing outgoing signals and applying the processed outgoing signals to the antennas of the corresponding array.

each of the diversity branches including:

a plurality of complex multipliers for respectively multiplying the processed incoming signals from the corresponding group of received units by weight coefficients;

a plurality of delay elements to respectively provide delays to the processed incoming signals so that the delayed signals are time-coincident with said decision signal;

a plurality of correlators for determining correlations between the delayed processed incoming signals and the decision signal and deriving therefrom the weight coefficients of the complex multipliers;

an adder for combining output signals of the complex multipliers to produce a sum signal;

an adaptive matched filter for converging delay-dispersed components of the sum signal and maximal-ratio combining said components according to said decision signal to produce a time-domain diversity-combined signal as one of the output signals of the diversity branches, and a plurality of second complex multipliers for multiplying a transmit signal by the weight coefficients derived by the correlators of the diversity branch to produce multiplied transmit signals and respectively supplying the multiplied transmit signals to said transmit units of the corresponding array as said outgoing signals.

* * * * *